(12) United States Patent (10) Patent No.: US 7,724,405 B2
Kondo (45) Date of Patent: May 25, 2010

(54) ORIGINAL COVER CLOSER AND OFFICE EQUIPMENT

(75) Inventor: Tetsuo Kondo, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 1124 days.

(21) Appl. No.: 11/328,368

(22) Filed: Dec. 29, 2005

(65) Prior Publication Data

US 2006/0158702 A1 Jul. 20, 2006

(30) Foreign Application Priority Data

Jan. 18, 2005 (JP) .............................. 2005-010760

(51) Int. Cl.
*H04N 1/04* (2006.01)
(52) U.S. Cl. ..................... 358/487; 358/497; 358/471; 358/474
(58) Field of Classification Search .................. 358/487, 358/497, 471, 474; 399/380, 377
See application file for complete search history.

(56) References Cited

U.S. PATENT DOCUMENTS 6,882,822 B2 * 4/2005 Gomi et al. ................. 399/380

FOREIGN PATENT DOCUMENTS

JP 3155659 2/2001

* cited by examiner

*Primary Examiner*—Houshang Safaipour
(74) *Attorney, Agent, or Firm*—Notaro, Michalos & Zaccaria P.C.

(57) ABSTRACT

To provide an original cover closer and an office equipment in which a position adjustment and positioning of an original cover can be performed easily, and a downsizing can be realized, the original cover closer which supports the original cover relative to an equipment main body of the office equipment openably/closably, includes: a position adjusting means adjusting a parallel position of the original cover relative to the equipment main body at a closer main body of the original cover closer, and an operation portion of the position adjusting means is constituted so as to be operable from a lateral side of the closer main body.

6 Claims, 12 Drawing Sheets

(a)

(b)

(c)

(a)

(b)

(c)

ORIGINAL COVER CLOSER AND OFFICE EQUIPMENT

BACKGROUND OF THE INVENTION

1. Field of the Invention

The present invention relates to an original cover closer suitable for use in an office equipment such as a copying machine, a printer, a facsimile machine, a scanner, and so on, and the office equipment including an original cover.

2. Description of the Related Art

An equipment main body of an office equipment such as a copying machine, a printer, a facsimile machine, a scanner, and so on has an original cover attached to be openable/closable at a rear portion of an upper surface of the equipment main body via an original cover closer. Such original cover closer normally carries out a function to bring an original placed on a contact glass at the equipment main body side into press-contact with the contact glass, and the one equipped with an original automatic feeder is known to perform a copying, printing, transmission of plural originals efficiently. This original automatic feeder is convenient in particular to copy, print, or transmit the plural originals because the originals are automatically fed to the original reading portion to perform the copying, printing, transmission when the originals are set to an original feeding portion provided at one side of an upper portion of the original cover. However, when the original is not fed in parallel relative to the original reading portion from the original feeding portion, the reading of the original is performed in a skewed state, and an accurate copying, printing, and transmission can not be performed.

An original cover closer is known, in which an original cover is supported openably/closably, and a parallel position of the original cover is adjustable, among the original cover closer with such original automatic feeder. As a publicly known document, there is Japanese Patent Publication No. 3155659. The original cover closer described in this publicly known document includes an axially supporting means supporting the original cover openably/closably at a rear portion of an upper surface of an equipment main body, and a position adjusting means adjusting a position of the original cover closer. This position adjusting means can perform an adjustment of a parallel position of the original cover by operating an operation portion.

Incidentally, in the publicly known original cover closer described above, the adjustment of the parallel position of the original cover can be performed easily because the operation portion of the position adjusting means is disposed at a front side of the axially supporting means, and it is possible for an operator to operate the operation portion without going to a rear side of the axially supporting means. However, the operation portion of the position adjusting means is protruding forward from the axially supporting means, and therefore, there is a case when the operation portion gets in the way of placing an original on a contact glass surface at the upper surface of the equipment main body. Besides, it prevents from a downsizing thereof because the operation portion is protruding forward from the axially supporting means.

SUMMARY OF THE INVENTION

The present invention has been made to solve the above-stated problems and its object is to provide an original cover closer and an office equipment in which a position adjustment and positioning of an original cover easily and a downsizing can be realized.

To achieve the above object, an original cover closer according to the present invention, which supports an original cover openably/closably relative to an equipment main body of an office equipment, including: a position adjusting means adjusting a parallel position of the original cover relative to the equipment main body at a closer main body of the original cover closer, and wherein an operation portion of the position adjusting means is constituted so as to be operated from a lateral side of the closer main body.

According to the present invention, the operation portion of the position adjusting means is constituted so that it can be operated from the lateral side of the closer main body, and therefore, it is possible for the operator to operate the operating portion without going to the rear side of the closer main body, so a position adjustment and positioning of the original cover can be performed easily. Besides, the operation portion is constituted so that it can be operated from the lateral side of the closer main body, and therefore, the operation portion does not get in the way when an original is placed on the upper surface of the equipment main body. Consequently, the position adjustment and positioning of the original cover can be performed easily, and the downsizing can be realized.

In the original cover closer according to the present invention, it is preferable that the closer main body includes: a mounting member movably mounted on the equipment main body and having both side plates; and a supporting member axially supported to be rotatable by the both side plates of the mounting member and to which the original cover is mounted, and wherein the position adjusting means includes: an adjusting plate mounted on the equipment main body; an operating member supported by the both side plates of the mounting member and varying a position of the mounting member relative to the equipment main body while engaged with the adjusting plate; and the operation portion provided at one of the both side plates and operating the operating member. Besides, in the original cover closer according to the present invention, it is preferable that the operating member is movably provided between the both side plates, an engaging projecting portion is provided at one of the operating member or the adjusting plate, an engaging recessed portion engaging with the engaging projecting portion is provided at the other of the operating member or the adjusting plate, and the operating member is constituted to move between the both side plates by the operation of the operation portion, and thereby, the mounting member is moved relative to the equipment main body. Besides, in the original cover closer according to the present invention, it is preferable that a lifting member overlapping with the supporting member, axially supported to be rotatable at a free end portion of the supporting member, and mounted on the original cover between the supporting member and the original cover; and a resilient means rotationally urging the original cover in an opening direction, and urging the lifting member in a direction overlapping with the supporting member, between the mounting member and the supporting member.

Besides, to achieve the above-stated object, the office equipment according to the present invention, including: the original cover closer according to the present invention. According to the present invention, as stated above, it is possible for the operator to operate the operation portion without going to the rear side of the closer main body, so the position adjustment and positioning of the original cover can be performed easily. Besides, the downsizing can be realized because the operation portion does not get in the way when an original is placed on the upper surface of the equipment main body.

As stated above, according to the original cover closer and the office equipment according to the present invention, the operation portion of the position adjusting means is constituted so as to be operated from the lateral side of the closer main body, and therefore, the operator can operate the operation portion without going to the rear side of the closer main body, and the position adjustment and positioning of the original cover can be performed easily, and the downsizing can be realized because the operation portion does not get in the way when an original is placed on the upper surface of the contact glass of the equipment main body.

BRIEF DESCRIPTION OF THE DRAWINGS

FIG. 8A is a sectional view taken along the line A-A shown by the arrows in FIG. 7, FIG. 8B is a view showing a state in which a closer main body is moved forward, and FIG. 8C is a view showing a state in which the closer main body is moved backward;

FIG. 10A is a plan view, FIG. 10B is a side view, and FIG. 10C is a front view;

FIG. 11A is a plan view, FIG. 11B is a side view, and FIG. 11C is a front view.

DETAILED DESCRIPTION OF THE PREFERRED EMBODIMENT(S)

Hereinafter, an original cover closer and an office equipment according to the present invention will be described based on the accompanying drawings.

Figure 1:
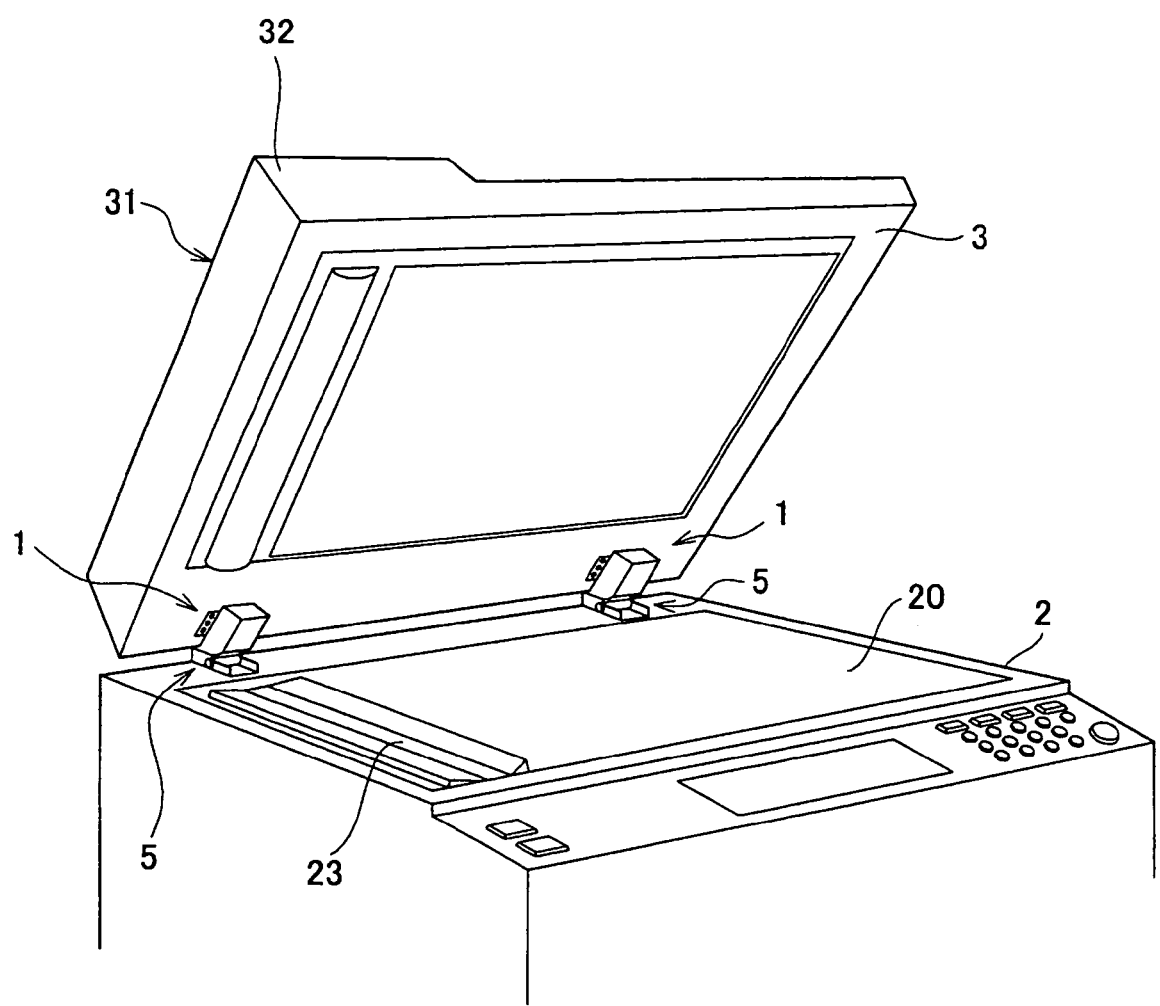
FIG. 1 is a perspective view showing an embodiment of an office equipment according to the present invention.
Figure 2:
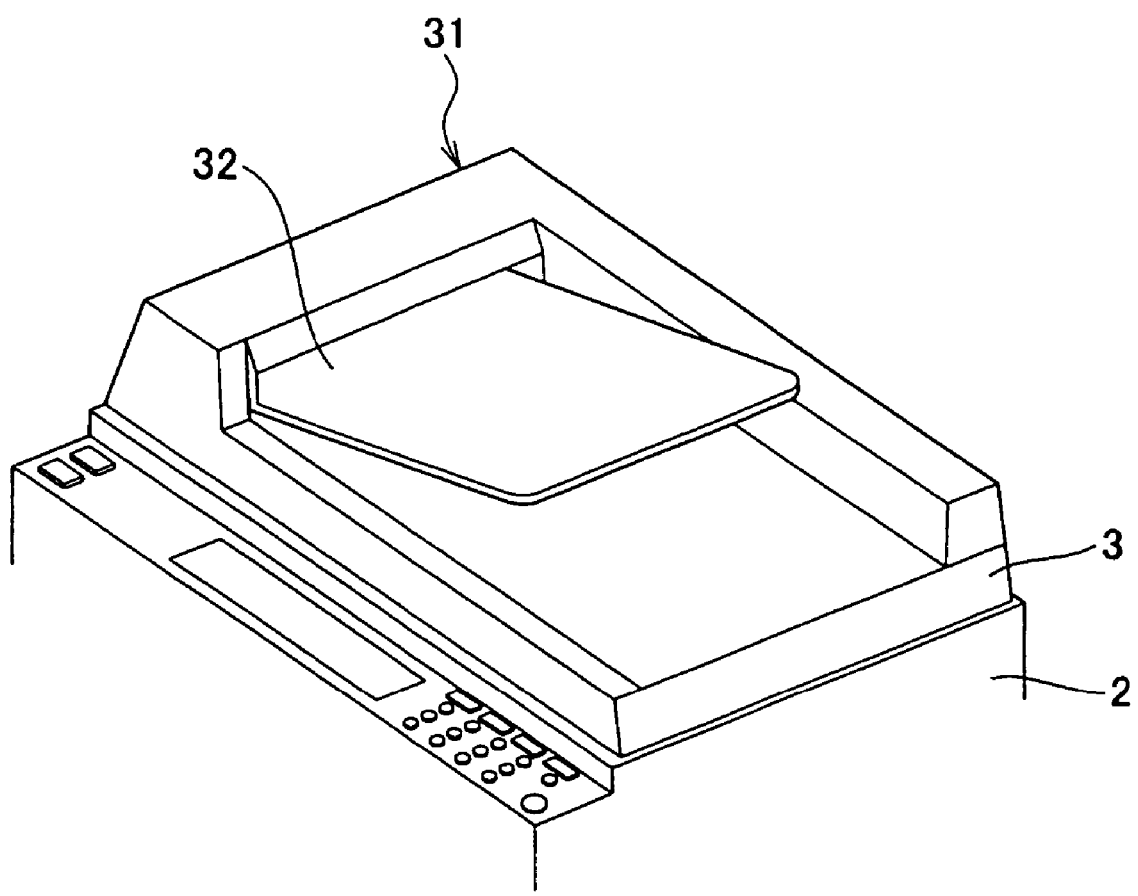
FIG. 2 is a perspective view showing a state in which an original cover in FIG. 1 is closed.
Figure 3:
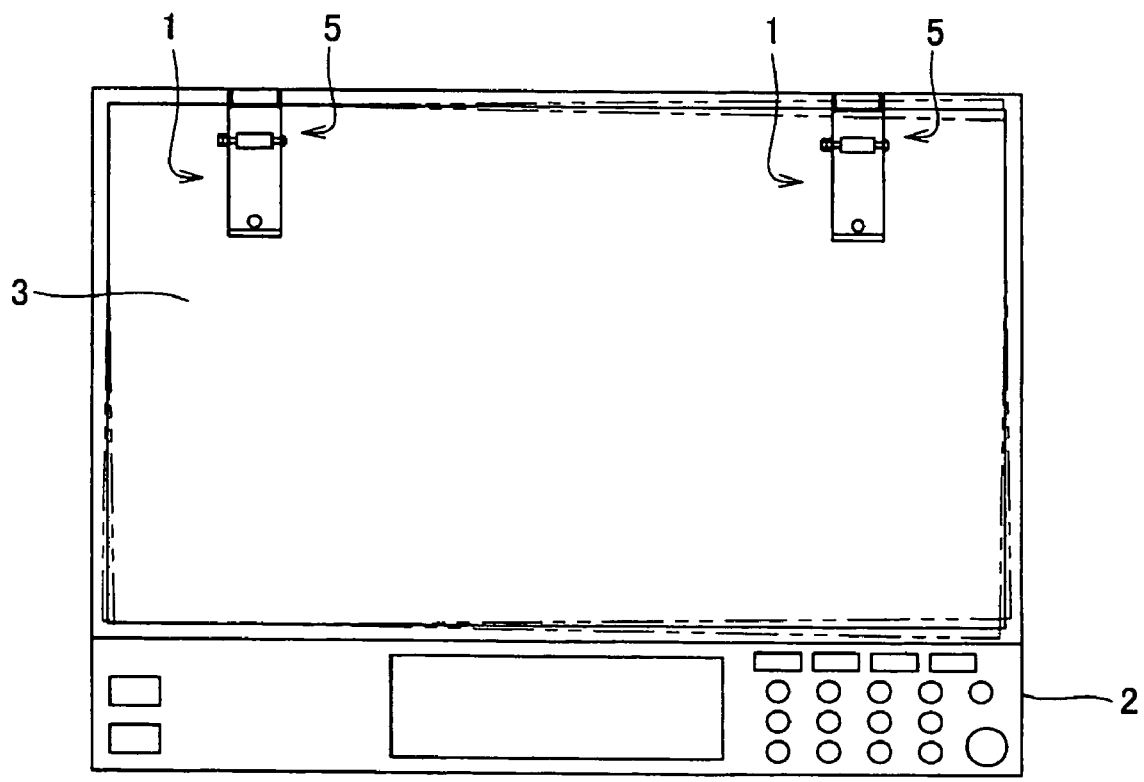
FIG. 3 is a view showing a relation of a parallel position of the original cover relative to an equipment main body.

FIG. 1 and FIG. 2 are views showing an embodiment of the office equipment according to the present invention. FIG. 3 is a view showing a relation of a parallel position of an original cover relative to an equipment main body. Incidentally, in FIG. 3, the original cover closer is shown in a solid line so as to see a positional relationship of the original cover closer according to the present invention. FIG. 4 to FIG. 8C are views showing an embodiment of the original cover closer according to the present invention. As shown in FIG. 1 to FIG. 8C, the original cover closer according to the present invention is mounted on a rear end portion of an equipment main body 2 of the office equipment to openably/closably support an original cover 3. It is not particularly limited as the office equipment, for example, a copying machine, a printer, a facsimile machine, a scanner, and so on can be cited, and a copying machine is preferable, in particular a copying machine with a facsimile machine is preferable.

An original automatic feeder 31 is provided at an upper portion of the original cover 3. The original automatic feeder 31 is the one for copying, printing, and transmitting plural originals efficiently. This original automatic feeder 31 includes an original feeding portion 32 provided at one side of the upper portion of the original cover 3, and it is constituted so that the plural originals are automatically fed to an original reading portion 23 of the equipment main body 2 (there is a case when the original reading portion is a contact glass 20) sequentially to perform a copying, printing, or transmission when the originals are set to this original feeding portion 32.

An original cover closer 1 according to the present invention is the original cover closer supporting the original cover 3 openably/closably relative to the equipment main body 2 of the office equipment, a position adjusting means 5 adjusting a parallel position of the original cover 3 relative to the equipment main body 2 is provided at a closer main body 4 of the original cover closer 1, and an operation portion 51 of the position adjusting means 5 is constituted to be operated from a lateral side of the closer main body 4. Two closers openably/closably supporting the original cover 3 are mounted on rear end portions of the equipment main body 2, and one of the two closers may be the original cover closer 1 according to the present invention. Namely, one of the two closers may be the original cover closer 1 according to the present invention, or both of them may be the original cover closers 1 according to the present invention. An example shown in the drawing is the case when both are the original cover closers 1 according to the present invention.

The closer main body 4 is movably mounted on the equipment main body 2, includes a mounting member 6 having both side plates 62, 62, and a supporting member 7, axially supported to be rotatable by the both side plates 62, 62 of the mounting member 6, to which the original cover 3 is mounted. Further, a lifting member 8 overlapping with the supporting member 7, axially supported to be rotatable at a free end portion of the supporting member 7 and attached to the original cover 3 is provided between the supporting member 7 and the original cover 3. Besides, it is preferable that a resilient means (not shown) rotationally urging the original cover 3 in an opening direction, and urging the lifting member 8 in a direction overlapping with the supporting member 7 is provided between the mounting member 6 and the supporting member 7.

The mounting member 6 is composed of a bottom plate 61 movably mounted on the equipment main body 2, the both side plates 62, 62 respectively extending in an orthogonal direction (including approximately orthogonal direction) relative to the bottom plate 61 from both side end portions of the bottom plate 61, and a rear plate 63 in approximately rectangular shape extending in the orthogonal direction (including approximately orthogonal direction) relative to the bottom plate 61 from one end portion (rear end portion) of the bottom plate 61.

The bottom plate 61 is formed in approximately rectangular shape. A mounting hole 65 for movably mounting the mounting member 6 to the equipment main body 2 by two fastening members 25, 26, for example, such as a screw or a bolt, is provided on this bottom plate 61. The two fastening members are composed of the first fastening member 25 screwed to a first mounting hole 21 at a front side of the equipment main body 2, and the second fastening member 26 screwed to a second mounting hole 22 at a rear side of the equipment main body 2. The first fastening member 25 is composed of a screwing portion 25a screwed to the first mounting hole 21, and a head portion 25b formed with a larger diameter than the screwing portion 25a. The second fastening member 26 is composed of a screwing portion 26a screwed to the second mounting hole 22, a head portion 26b formed with a larger diameter than the screwing portion 26a, and a sliding portion 26c provided between the screwing portion 26a and the head portion 26b. The sliding portion 26c of the second fastening member 26 has a larger diameter than the screwing portion 26a and a smaller diameter than the head portion 26b, and is formed in column shape having a length in an axial direction longer than a thickness of the bottom plate 61.

The mounting hole 65 is formed in approximately oval shape extending in a longitudinal direction at a center portion in a width direction of the bottom plate 61. The center portion of the mounting hole 65 is formed in circular shape having a size larger than the head portion 25b of the first fastening member 25 and the head portion 26b of the second fastening member 26. A front portion 65a at a front side of the mounting hole 65 is a portion to align holes with the first mounting hole 21. A width of the front portion 65a is formed with a larger diameter than the screwing portion 25a of the first fastening member 25 and a smaller diameter than the head portion 25b thereof. A rear portion 65b at a rear side of the mounting hole 65 is a portion to align holes with the second mounting hole 22. A width of the rear portion 65b is formed in a size slightly larger than the sliding portion 26c of the second fastening member 26. Herewith, in a state that the front portion 65a of the mounting hole 65 is aligned with the first mounting hole 21 and the rear portion 65b is aligned with the second mounting hole 22 respectively, the screwing portion 25a of the first fastening member 25 is screwed to the first mounting hole 21, the screwing portion 26a of the second fastening member 26 is screwed to the second mounting hole 22, to bring an end portion of the sliding portion 26c into contact with or close to the upper surface of the equipment main body 2, and thereby, the mounting member 6, namely, the closer main body 4 is slidably mounted on the equipment main body 2 in forward and backward direction of the equipment main body 2.

The side plate 62 of the mounting member 6 is formed in an approximately L-shape, extends in the orthogonal direction (including approximately orthogonal direction) relative to the bottom plate 61, and a shaft hole (not shown) to which a first hinge pin 11 is inserted is provided at a tip portion (upper portion) thereof. A pressure bearing pin hole (not shown) to which a pressure bearing pin 13 is inserted is provided at a position of the bottom plate 61 side (lower portion) and shifted to an inner side (forward) than the shaft hole of the side plate 62. The pressure bearing pin 13 is a pressure bearing member with which an outer front surface of a bottom portion of a cam slider 92 is in contact, and this pressure bearing member is not limited to a pin such as the pressure bearing pin 13, and it may be a roller, for example, a pressure bearing roller.

The supporting member 7 is composed of an upper plate 71 being a top plate, both side plates 72, 72 respectively extending in an orthogonal direction (including approximately orthogonal direction) relative to the upper plate 71 from both side end portions of the upper plate 71, and fixedly supporting plates 73 formed by folding tip portions of the side plates 72, 72 for 90 degrees into sides to face with each other. An accommodating portion 78 is constituted by these upper plate 71, the both side plates 72, 72, and the fixedly supporting plates 73.

At one end portion (rear end portion) of the both side plates 72, 72, a second hinge pin hole (not shown) to which a second hinge pin 12 is inserted is provided, and a notch portion 74 into which an operation pin 14 is put is provided. At the other end portion (front end portion) of the both side plates 72, 72, a shaft insertion hole (not shown) is provided. The shaft insertion hole of the both side plates 72, 72 and the shaft hole of the mounting member 6 are aligned holes, the fist hinge pin 11 is inserted into these respective holes, and thereby, the supporting member 7 is rotationally coupled to the mounting member 6 centering on the first hinge pin 11.

The lifting member 8 is the one to stably bring thick originals into press-contact with the upper surface of the equipment main body 2. The lifting member 8 is formed by an upper plate 81 mounted on a rear end side of the original cover 3 with a machine screw and so on, and both side plates 82 respectively extending in an orthogonal direction (including approximately orthogonal direction) relative to the upper plate 81 from both end portions of the upper plate 81, in an approximately U-shape so as to cover the supporting member 7. A second hinge pin insertion hole (not shown) is provided at a portion of the upper plate 81 side from the center of one end portion (rear end portion) of the lifting member 8, and an operation pin hole (not shown) to which the operation pin 14 is inserted is provided at a portion of the other end portion side than the second hinge pin insertion hole, and an opposite side of the upper plate 81 side from the center. The operation pin 14 is inserted to be fixed into the operation pin hole of the both side plates 82, 82. The second hinge pin insertion hole of the both side plates 82, 82 of the lifting member 8 and the second hinge pin hole of the both side plates 72, 72 of the supporting member 7 are aligned holes, then the second hinge pin 12 is inserted into these respective holes, and thereby, the lifting member 8 and the supporting member 7 are rotationally coupled with each other centering on the second hinge pin 12.

The resilient means rotationally urges the original cover 3 in an opening direction, and urges the lifting member 8 in a direction to be overlapped with the supporting member 7, and a resilient force to urge the original cover 3 is smaller than a moment of the original cover 3 when the original cover 3 is at a predetermined opening angle or less. Incidentally, in the present invention, the opening direction means the direction in which the original cover 3 is getting away from the contact glass 20 when the original cover 3 is rotated. The opening angle in the present invention is the angle of the original cover 3 relative to the contact glass 20 surface being the upper surface of the equipment main body 2. The predetermined opening angle in the present invention is the angle in which, for example, the urging force in which the resilient means urges the original cover 3 becomes smaller than the moment of the original cover 3.

The resilient means is, for example, a compression coil spring (not shown). The compression coil spring is inserted into the supporting member 7, and resiliently provided between the operation pin 14 and the pressure bearing pin 13. A spring bearing member 91 is provided between the compression coil spring and the operation pin 14, and a cam slider 92 is provided between the compression coil spring and the pressure bearing pin 13.

The number of the compression coil spring is not particularly limited, and it may be one, two or more, and it is to urge the spring bearing member 91 and the cam slider 92 in the directions getting away from each other. The compression coil spring rotationally urges the original cover 3 in the opening direction, and the resilient force to urge the original cover 3 becomes smaller than the moment of the original cover 3 when the original cover 3 is less than the predetermined opening angle (for example, 20 degrees (including around 20 degrees)).

The spring bearing member 91 and the cam slider 92 are each formed rectangular in cross section and a cylindrical shape with a bottom. The spring bearing member 91 and the cam slider 92 are individually inserted into the accommodating portion 78 of the supporting member 7 in a slidably fit state while opening portions thereof are facing with each other and the compression coil spring is accommodated therebetween. The spring bearing member 91 and the cam slider 92 are formed in lengths to be fit in the accommodating portion 78 of the supporting member 7 when the bottom plate 61 of the mounting member 6 and the supporting member 7 (upper plate 71) are approximately in parallel (for example, the original cover 3 is in close contact with the contact glass 20 being the upper surface of the equipment main body 2 (when the original cover is at a closing position)).

A protruding portion 92a is provided at an approximately center portion of an outer front surface of the bottom portion (sometimes referred to as closed portion) of the cam slider 92. This protruding portion 92a is formed at the upper plate 71 of the supporting member 7 extending approximately in parallel. The outer front surface of the bottom portion of the cam slider 92 at the fixedly supporting plate 73 side from the protruding portion 92a is formed as a sloped portion 92b sloping little by little. The protruding portion 92a and the sloped portion 92b at the outer front surface of the bottom portion of the cam slider 92 are formed as a kind of a cam.

Namely, when the original cover 3 is rotated centering on the first hinge pin 11 in the direction getting away from the contact glass 20 (upward), the portion in contact with the pressure bearing pin 13 is gradually slid from the protruding portion 92a to the sloped portion 92b, and the cam slider 92 is slid toward the rear end portion side within the supporting member 7 pressed by the compression coil spring, and the compression coil spring expands gradually. When the original cover 3 reaches a maximum usable opening angle (for example, from 60 degrees (including around 60 degrees) to 70 degrees (including around 70 degrees)), the opening/closing thereof is controlled by an original cover opening/closing controlling mechanism (not shown).

There is a case when a damper unit (not shown) is provided within the compression coil spring. This damper unit operates to reduce a rotation speed of the original cover 3 only when the original cover 3 is at an angle less than a specified angle (for example, around 10 degrees or less) which is under the opening angle being the predetermined rotation angle of the original cover 3 when the original cover 3 is rotated in the closing direction. Incidentally, the closing direction in the present invention means a direction in which the original cover 3 comes close to the contact glass 20 when the original cover 3 is rotated. The angle less than the specified angle in the present invention is not limited particularly if it is less than the above-described predetermined opening angle.

The damper unit is, for example, an oil damper unit and so on. The damper unit is not limited particularly as long as it can reduce the rotation speed of the original cover 3 only when the original cover 3 is at the angle less than the specified angle (for example, around 10 degrees or less). The damper unit is, for example, mainly constituted by a cylinder in which the oil such as the silicon oil is filled, and a piston (not shown) movably provided within the cylinder, to which a piston rod is coupled, and urged so that an exposing length exposing from the cylinder of the piston rod becomes long.

The position adjusting means 5 is to adjust the parallel position of the closer main body 4 relative to the equipment main body 2, namely, the parallel position of the original cover 3, via the mounting member 6. This position adjusting means 5 includes, for example, an adjusting plate 52 mounted on the equipment main body 2, an operating member 53 supported by the both side plates 62, 62 of the mounting member 6, varying the position of the mounting member 6 relative to the equipment main body 2 while engaged with the adjusting plate 52 via an engaging means 54, and an operation portion 51 provided at one of the both side plates 62, 62 of the mounting member 6 to operate the operating member 53.

Figure 7:
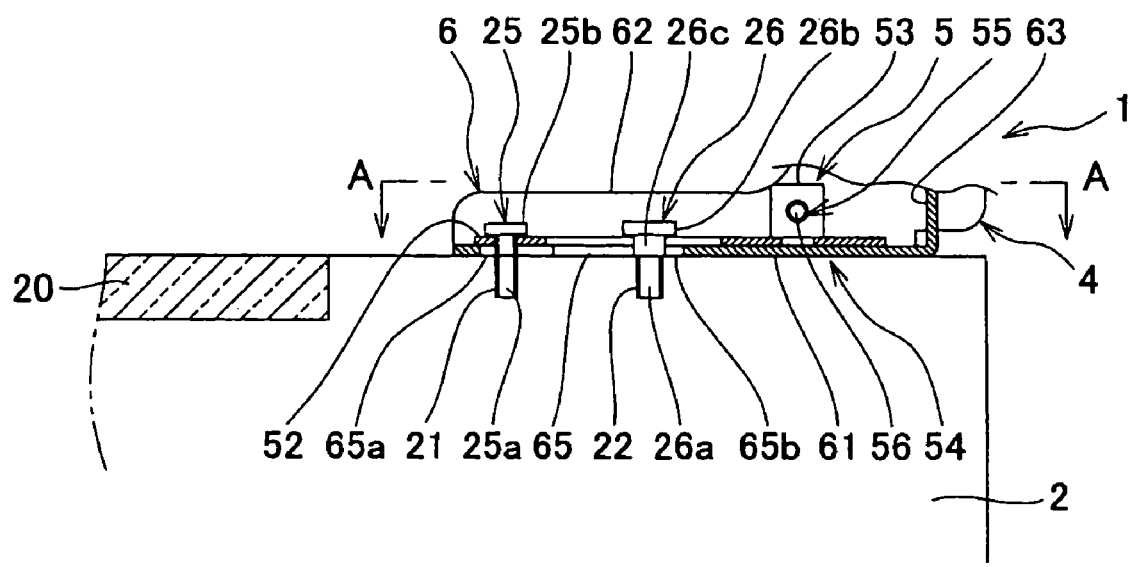
FIG. 7 is a side sectional view showing the embodiment of a substantial part of the original cover closer according to the present invention.
Figure 8:
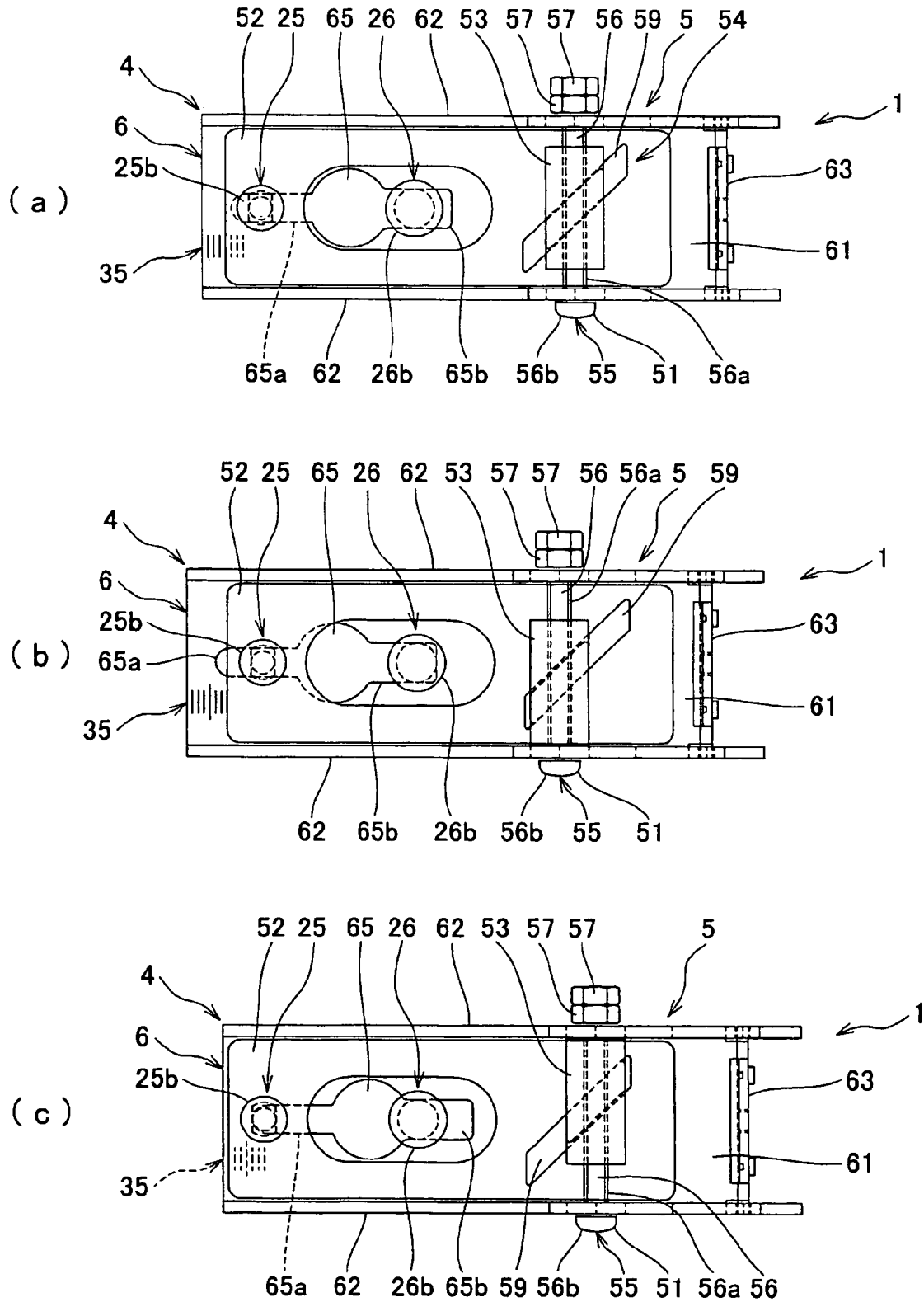
FIG. 8A to FIG. 8C are plan views showing the embodiment of the substantial part of the original cover closer according to the present invention.
Figure 9:
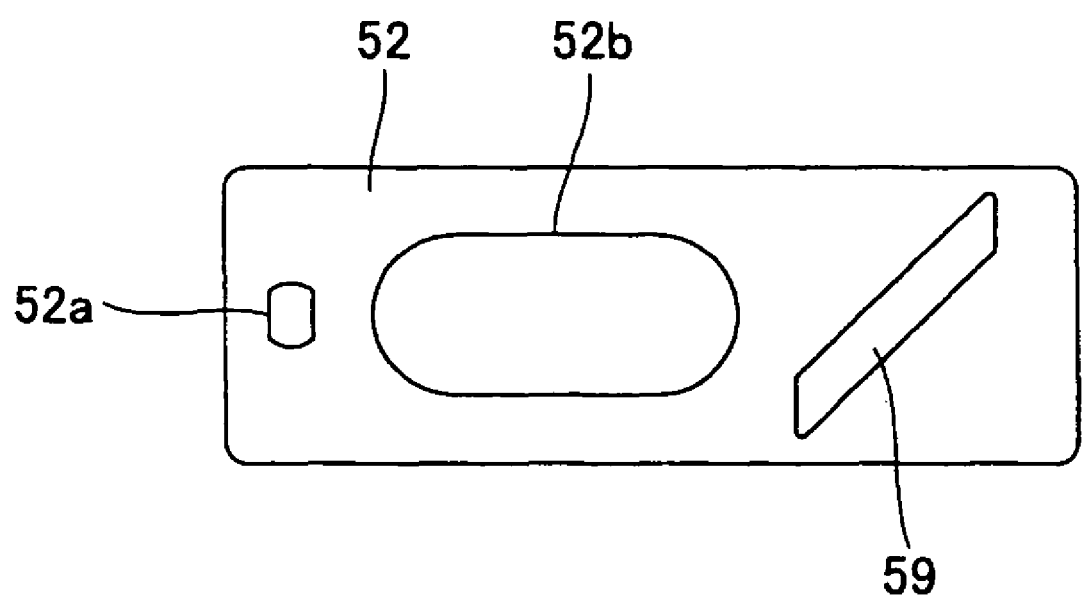
FIG. 9 is a plan view showing an embodiment of an adjusting plate according to the present invention.
Figure 10:
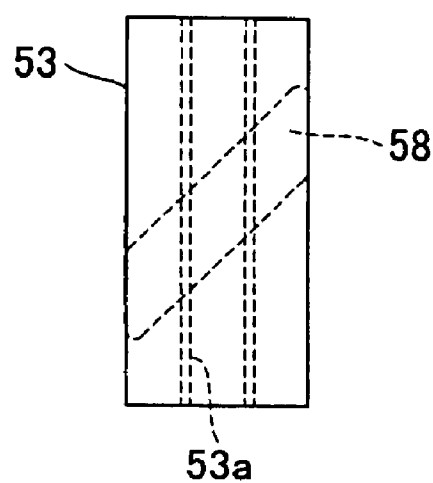
FIG. 10A to FIG. 10C are views showing an embodiment of an operating member according to the present invention.
Figure 10:
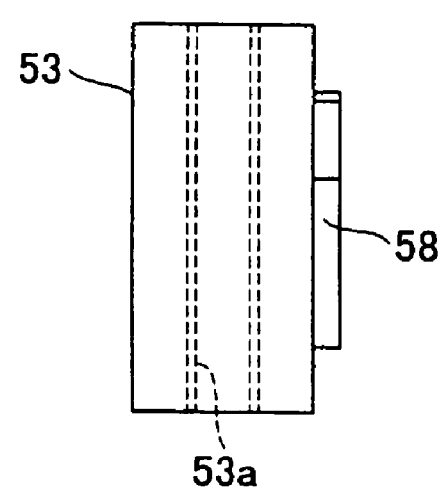
Figure 10:
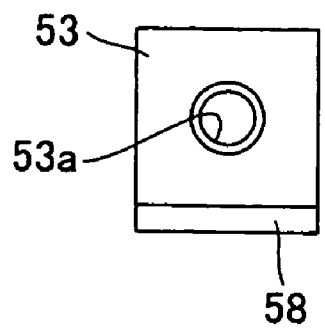

The adjusting plate 52 is formed in approximately rectangular plate shape slightly smaller than the bottom plate 61 of the mounting member 6 as shown in FIG. 7 to FIG. 9. A width of the adjusting plate 52 is formed in a size slightly shorter than the length between the side plates 62, 62 of the mounting member 6. This adjusting plate 52 is mounted on the bottom plate 61 to be overlapped. In the vicinity of one end portion (end portion to be front side) of the adjusting plate 52, an insertion hole 52a to which the screwing portion 25a of the first fastening member 25 is inserted is provided, this insertion hole 52a is aligned with the first mounting hole 21 and the front portion 65a of the mounting hole 65, and the screwing portion 25a of the first fastening member 25 is screwed to the first mounting hole 21 after it is penetrated into the insertion hole 52a and the front portion 65a, to thereby mount the adjusting plate 52 to the equipment main body 2. Besides, a through hole 52b in oval shape exposing the center portion and the rear portion 65b of the mounting hole 65 is provided at the adjusting plate 52, and a sliding of the mounting member 6, namely, the closer main body 4 in forward and backward direction of the equipment main body 2 is enabled.

As shown in FIG. 7, FIG. 8A to FIG. 8C, and FIG. 10A to FIG. 10C, the operating member 53 may be formed in any way as long as it can vary the position of the mounting member 6 relative to the equipment main body 2 while engaging with the adjusting plate 52, and it is formed, for example, in rectangular cylindrical shape. Namely, an outer shape of the operating member 53 is formed in rectangular, and an inner shape thereof is circular and a thread groove 53a is provided by screwing. The length of the operating member 53 (length in axial direction) is formed in a size shorter than the length between the side plates 62, 62 of the mounting member 6. A screwing member 55 is screwed to the thread groove 53a of the operating member 53.

The screwing member 55 is screwed to the thread groove 53a of the operating member 53 to move the operating member 53, and it is not particularly limited as long as it can move the operating member 53, and for example, a screw 56 and so on is used. This screw 56 is provided while penetrating the both side plates 62, 62 of the mounting member 6. Namely, screw insertion holes (not shown) to which the screw 56 is inserted are respectively provided facing with each other on the side plates 62, 62. The screw insertion hole is formed, for example, in circular shape having a diameter larger than the screwing portion 56a of the screw 56 and smaller than the head portion 56b. The position of the screw insertion hole is preferable to be at a rear side than the mounting hole 65, and a portion in which one surface of the operating member 53 (it may be a lower surface) is to be in contact with or close to the bottom plate 61 with a low friction force when the screw 56 is screwed to the operating member 53 between the side plates 62, 62.

It is preferable that the length of the screwing portion 56a of the screw 56 is formed in a size longer than the length between the both side plates 62, 62, and when the screw insertion holes of the both side plates 62, 62 are penetrated through, a tip portion is protruding from the side plate 62, and, for example, it is formed in the size in which two nuts 57 are able to be screwed to the protruding tip portion. Herewith, the screw 56 is rotatably mounted on the side plates 62, 62. Namely, the screwing portion 56a of the screw 56 is inserted into the screw insertion holes of the both side plates 62, 62 to be respectively penetrated, and the first nut 57 is screwed to the screwing portion 56a protruding from the side plate 62 so that the screw 56 can be rotated. For example, under a state that the head portion 56b of the screw 56 is brought into contact with or closed to the outer front surface of the one side plate 62, and the first nut 57 is screwed to the screwing portion 56a protruding from the outer front surface of the other side plate 62 so that the nut 57 is closed to the outer front surface of the other side plate 62. After they are screwed, the second nut 57 is screwed to the screwing portion 56a to be in contact with the first nut 57. Herewith, the screw 56 is attached to be rotatable to the side plates 62, 62, without being loosened owing to the double nuts. The head portion 56b of the screw 56 is the operation portion 51, and the operating member 53 reciprocates between the side plates 62, 62 by rotating (operating) the operation portion 51 with, for example, a tool such as a driver.

The engaging means 54 engages the adjusting plate 52 and the operating member 53 to vary the position of the mounting member 6, namely the closer main body 4, relative to the equipment main body 2, and it may be formed in any way as long as the position of the mounting member 6 can be varied. For example, an engaging projecting portion 58 may be provided at one of the adjusting plate 52 or the operating member 53, and an engaging recessed portion 59 engaging with the engaging projecting portion 58 may be provided at the other of the adjusting plate 52 or the operating member 53.

Figure 11:
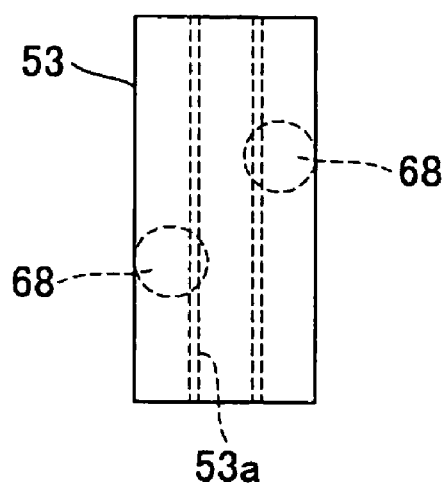
FIG. 11A to FIG. 11C are views showing another embodiment of an operating member according to the present invention.
Figure 11:
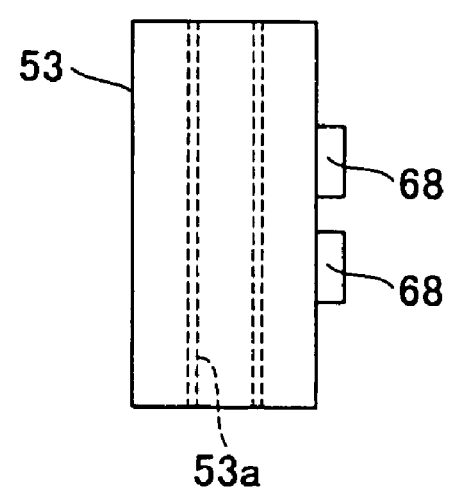
Figure 11:
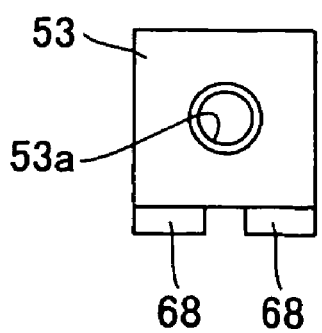

The engaging projecting portion 58 is provided, for example, at a lower surface of the operating member 53. This engaging projecting portion 58 may be formed in any way, and for example, it may be formed to be protruded from the lower surface of the operating member 53, and in a liner state extending to the whole width of the lower surface inclining for 45 degrees (including around 45 degrees) relative to the longitudinal direction of the operating member 53. Further, as shown in FIG. 11A to FIG. 11C, it may be formed, for example, by projecting two or more, for example, two projecting portions 68 such as round bosses in column shape from the lower surface, and disposing these two projecting portions 68, 68 on a line inclining for 45 degrees (including around 45 degrees) relative to the longitudinal direction of the operating member 53.

The engaging recessed portion 59 is, for example, provided at the adjusting plate 52 as shown in FIG. 7 to FIG. 9. This engaging recessed portion 59 is provided, for example, at the rear side from the mounting hole 65 of the adjusting plate 52 so as to face with the engaging projecting portion 58, namely between in the vicinity of both side portions of the adjusting plate 52 inclining for 45 degrees (including around 45 degrees) relative to the longitudinal direction of the adjusting plate 52. The width of the engaging recessed portion 59 is formed in a size slightly larger than the width of the engaging projecting portion 58. The engaging projecting portion 58 is engaged with this engaging recessed portion 59, and thereby, the operating member 53 moves between the side plates 62, 62, and the mounting member 6, namely, the closer main body 4 is slide-moved in either one of the forward or backward direction relative to the equipment main body 2 while the engaging projecting portion 58 is guided by the engaging recessed portion 59, when the operation portion 51 is operated.

Next, an operation of the original cover closer according to the present invention is described.

Figure 4:
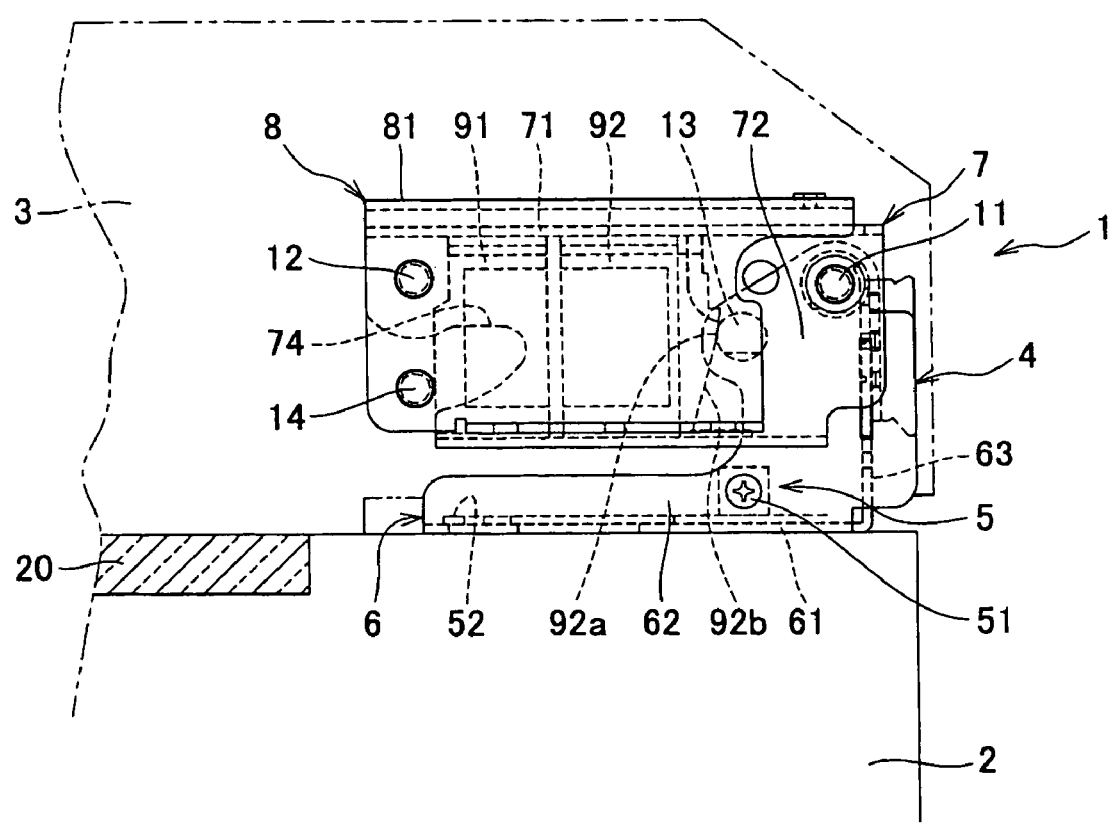
FIG. 4 is a side view showing an embodiment of an original cover closer according to the present invention.
Figure 5:
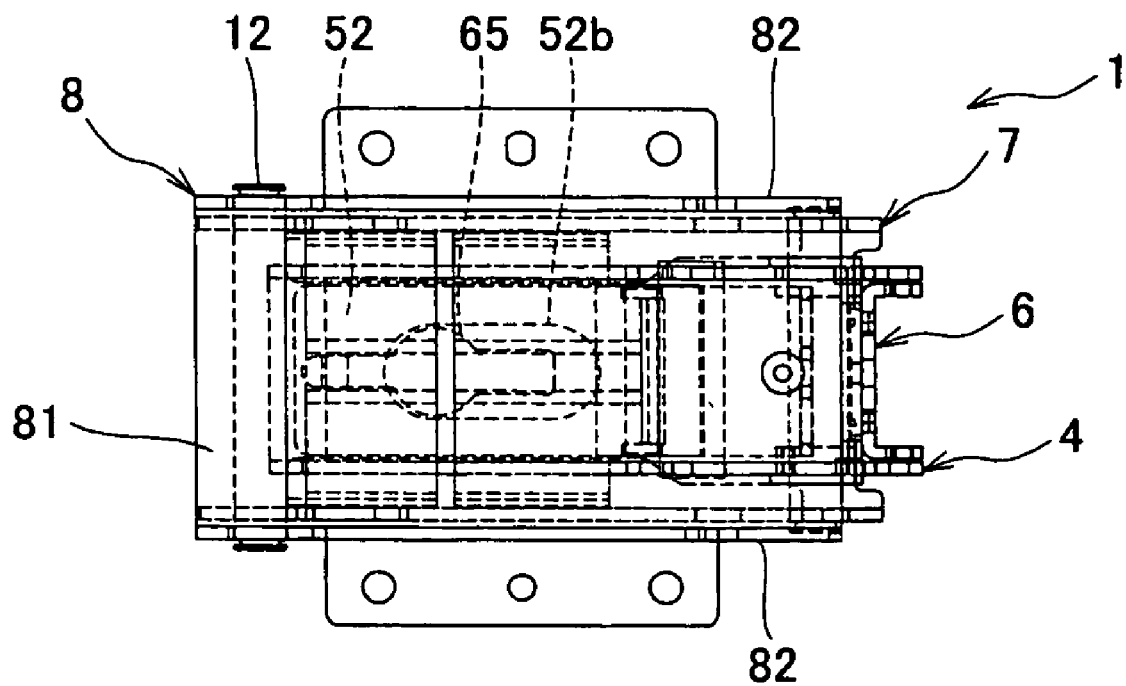
FIG. 5 is a plan view showing the embodiment of the original cover closer according to the present invention.
Figure 6:
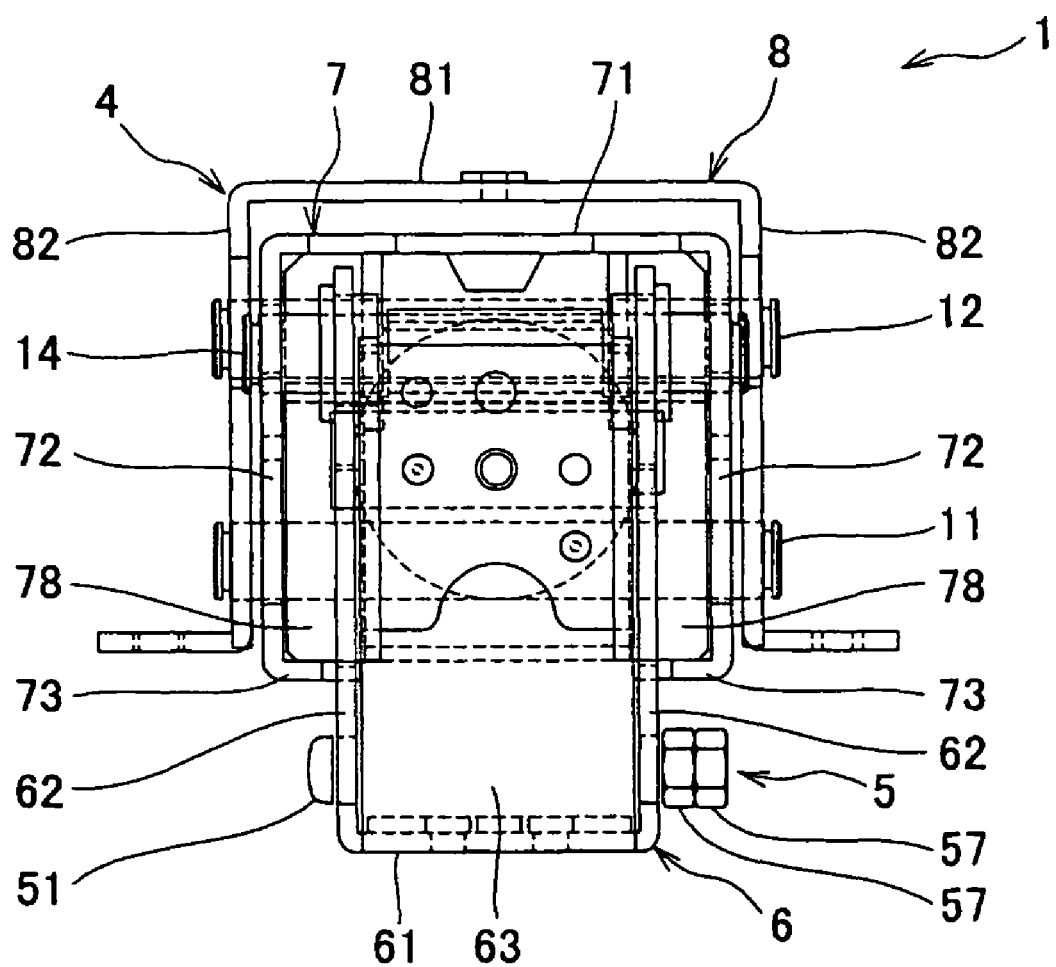
FIG. 6 is a rear view showing the embodiment of the original cover closer according to the present invention.

As shown in FIG. 2 and FIG. 4, the original cover 3 is in close contact with the contact glass 20 of the equipment main body 2 in a state when the equipment main body 2 is not used. To place an original on the contact glass 20, at first, the original cover 3 is lifted upward by holding a grip portion provided at or in the vicinity of an end portion and so on, on the opposite side from the portion where the lifting member 8 of the original cover 3 is mounted, as shown in FIG. 1. Namely, the original cover 3 is rotated centering on only the first hinge pin 11 to thereby expose the surface of the contact glass 20 to the outside. When the original cover 3 is rotated as stated above, it is possible to rotate the original cover 3 in the opening direction without feeling a weight thereof, because it is rotationally urged in the opening direction by the resilient force of the compression coil spring.

After the original is placed on the exposed surface of the contact glass 20, the lifted original cover 3 is pulled down. Namely, the original cover 3 is rotated (moved downward) centering on the first hinge pin 11 in the direction to be in contact with the contact glass 20. When the original cover 3 is rotated as stated above, at first, some force is required to resist the urging force of the compression coil spring. However, for example, when the opening angle of the original cover 3 becomes 20 degrees (including around 20 degrees) or less, the weight of the original cover 3 becomes larger than the urging force of the compression coil spring, and therefore, the original cover 3 rotates as if it is falling. When the opening angle of the original cover 3 becomes to be at the specified angle, for example 10 degrees (including around 10 degrees), the tip portion of the piston rod of the damper unit is in contact with the inner surface of the bottom portion of the cam slider 92, the piston rod is moved into the cylinder and the exposed length of the piston rod is shortened, and thereby the rotation speed of the original cover 3 is reduced. As a result, the rotation speed of the original cover 3 is controlled by the damper unit, and the original cover 3 does not collide against the contact glass 20 vigorously.

Besides, when originals are thick such as a book, a part in the vicinity of the supporting member 7 of the original cover 3 is in contact with the end portion or in the vicinity of the supporting member 7 side of the originals, and a space is formed between the end portion at the opposite side from the end portion of the supporting member 7 side of the originals and the original cover 3. Namely, the original cover 3 at the end portion of the grip portion side becomes in a floating state. For example, in the vicinity of the end portion of the grip portion side of the floating original cover 3 is pressed toward the contact glass 20 side, the operation pin 14 presses the spring bearing member 91 to the cam slider 92 side, then the spring bearing member 91 moves toward the cam slider 92 side against the urging force of the compression coil spring, and the original cover 3 (lifting member 8) is rotated centering on the second hinge pin 12. Namely, the original cover 3 moves so as to cover the upper portion of the originals. For example, when the upper portion of the originals is a flat surface, the original cover 3 is in surface contact with this upper portion. Consequently, the originals having a large thickness is stably in close contact is with the contact glass 20.

As stated above, the original cover 3 is rotationally supported, and therefore, it is possible to bring the originals in close contact with the surface of the contact glass 20 stably regardless of the thickness of the originals.

As shown in FIG. 2 and FIG. 4, for example, to copy plural originals, the plural originals are set to the original feeding portion 32 at the upper portion of the original cover 3 while the original cover 3 is in close contact with the contact glass 20 of the equipment main body 2. After they are set, a start button is press operated, and thereby, the plural originals are automatically fed from the original feeding portion 32 to the original reading portion 23 sequentially to be continuously copied one by one.

When the originals are fed from the original feeding portion 32 to the original reading portion 23, a reading of the original is performed in a skewed state and an accurate copying and so on cannot be performed, if the original is not fed in parallel relative to the original reading portion 23. In this case, for example, in the original cover closer 1 according to the present invention, the position adjusting means 5 is provided, and therefore, it is possible to adjust the position of the original cover 3 relative to the equipment main body 2. Namely, for example, when the original cover 3 is in close contact with the contact glass 20 of the equipment main body 2, the original cover 3 is lifted upward to be rotated centering on the first hinge pin 11 as same as the above-description, and the head portions 25b of the first fastening members 25 of the two original cover closers 1 are respectively exposed.

For example, the first fastening member 25 of the original cover closer 1 at a right side (opposite side from the side where the original automatic feeder 31 is provided) is rotated to enable the sliding of the mounting member 6 in forward and backward direction by loosening the fastening of the first fastening member 25. While keeping this state, the head portion 56b of the screw 56 being the operation portion 51 is rotated (operated) by using, for example, a tool such as a driver and so on, then the mounting member 6, namely, the original cover 3 is slide-moved in either one of forward or backward direction relative to the equipment main body 2 while the operating member 53 is moved between the side plates 62, 62 and the engaging projecting portion 58 is guided by the engaging recessed portion 59, and the original cover 3 is moved as shown in a chain double-dashed line in FIG. 3.

More specifically, for example, as shown in FIG. 8A, when the operating member 53 is positioned at a center between the side plates 62, 62, the screw 56 is rotated in one direction, and then, the operating member 53 is in contact with or closed to one side plate 62 and the mounting member 6, namely, the closer main body 4 is slide-moved forward, as shown in FIG. 8B. Besides, the screw 56 is rotated in a reverse direction, the operating member 53 is in contact with or closed to the other side plate 62 and the mounting member 6, namely, the closer main body 4 is slide-moved backward, as shown in FIG. 8C. As stated above, the operation portion 51 is operated, and thereby, the mounting member 6 is slide-moved to make a fine adjustment of the parallel position of the original cover 3 relative to the equipment main body 2. As a result, the parallel position of the original cover 3 relative to the equipment main body 2 can be fine adjusted so that the original is fed from the original feeding portion 32 to the original reading portion 23 in parallel.

In this case, the operation portion 51 is provided at the side plate 62 of the mounting member 6, and therefore, it is possible for an operator to operate the operation portion 51 without going to the rear side of the equipment main body 2, and the position adjustment and positioning of the original cover 3 can be performed easily. Besides, a scale 35 is provided at a portion where it is on the bottom plate 61 of the mounting member 6 and the end portion of front side of the adjusting plate 52 is moved, and thereby an adjusting amount of the position adjustment of the closer main body 4 relative to the equipment main body 2 can be recognized visually, and the adjustment of the closer main body 4 can be performed more easily. Besides, the operation portion 51 is provided at the side plate 62, and therefore, the operation portion 51 does not get in the way when the original is placed on the upper surface of the equipment main body 2, and the downsizing can be realized.

Consequently, in the original cover closer 1 according to the present invention, the operation portion 51 of the position adjusting means 5 is provided at the side portion of the closer main body 4, and therefore, the operator can operate the operation portion 51 without going to the rear side of the closer main body 4, and the position adjustment and positioning of the original cover 3 can be performed easily. Besides, the operation portion 51 does not get in the way when an original is placed on the upper surface of the equipment main body 2, and the downsizing can be realized.

Incidentally, in the above-stated embodiment of the present invention, the one in which the damper unit is used is shown, but it can be applied as it is to the original cover closer having a constitution in which the damper unit is not used.

Figure 12:
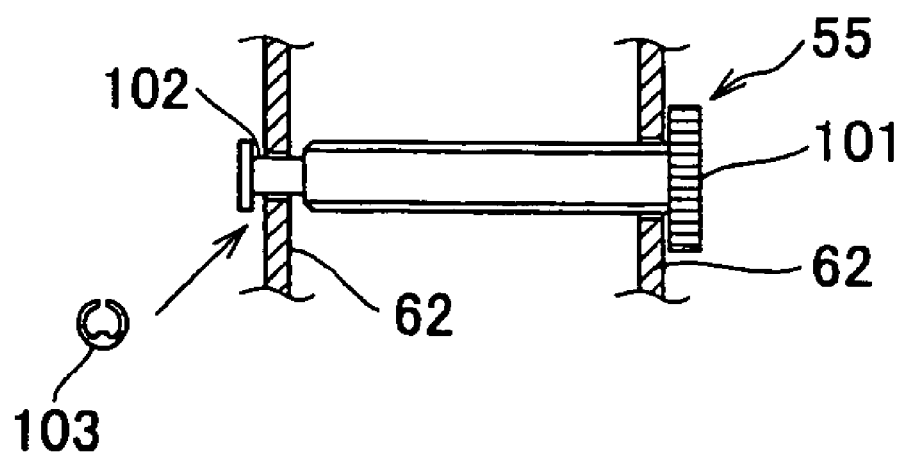
FIG. 12 is a sectional view showing another embodiment of a screwing member according to the present invention.

Besides, the above-stated head portion 56b of the screw 56 is formed in spherical shape and a groove in approximately cross shape is formed, to be rotated (operated) by using the tool such as the driver. However, it is not limited to this, and for example, a head portion 101 is formed in column shape, and a lot of grooves are provided at peripheral surface thereof, as shown in FIG. 12, namely, the head portion 101 is made to be an ornamental machine screw so that the head portion can be directly rotated with fingers. Besides, as the screwing member 55, it may be the one in which a thread groove to be screwed to the operating member 53 is provided at a periphery between the side plates 62, 62, and it may be mounted to be rotatable to the side plates 62, 62 without using a nut. For example, as shown in FIG. 12, the screwing member 55 in which the head portion 101 is formed as the ornamental machine screw is inserted into the screw insertion hole of the side plates 62, 62, a snap ring 103 in an E-shape is mounted on a tip portion 102 protruding from the side plate 62 at the opposite side from the head portion 101, to thereby the screwing member 55 may be mounted to be rotatable to the side plates 62, 62.

As has been described, the original cover closer according to the present invention can be suitably used as the original cover closer of the office equipment, in particular, such as a copying machine, a printer, a facsimile machine, a scanner, and so on, because the operator can operate the operation portion without going to the rear side of the closer main body, the position adjustment and positioning of the original cover can be easily performed, the operation portion does not get in the way when an original is placed on the upper surface of the contact glass of the equipment main body, and the downsizing can be realized.

What is claimed is:

1. An original cover closer, which supports an original cover openably/closably relative to an equipment main body of an office equipment, comprising:
   a closer main body includes a mounting member movably mounted on the equipment main body and having both side plates, and a supporting member axially supported to be rotatable by the both side plates of the mounting member and to which the original cover is mounted;
   a position adjusting means adjusting a parallel position of the original cover relative to the equipment main body at a closer main body of the original cover closer,
   wherein the position adjusting means includes an adjusting plate mounted on the equipment main body, an operating member supported by the both side plates of the mounting member and varying a position of the mounting member relative to the equipment main body while engaged with the adjusting plate, and an operation portion provided at one of the both side plates and operating the operating member; and wherein an operation portion of said position adjusting means is constituted so as to be operated from a lateral side of the closer main body.

2. The original cover closer according to claim 1, wherein the operating member is movably provided between the both side plates, an engaging projecting portion is provided at one of the operating member or the adjusting plate, an engaging recessed portion engaging with the engaging projecting portion is provided at the other of the operating member or the adjusting plate, and wherein the operating member is constituted to move between the both side plates by the operation of the operation portion, and thereby, the mounting member is moved relative to the equipment main body.

3. The original cover closer according to claim 1, further comprising:

a lifting member overlapping with the supporting member, axially supported to be rotatable at a free end portion of the supporting member, and mounted on the original cover between the supporting member and the original cover; and a resilient means rotationally urging the original cover in an opening direction, and urging said lifting member in a direction overlapping with the supporting member, between the mounting member and the supporting member.

4. An office equipment, comprising:

the original cover closer according to claim 1.

5. An office equipment, comprising:

the original cover closer according to claim 2.

6. The original cover closer according to claim 2, further comprising:

a lifting member overlapping with the supporting member, axially supported to be rotatable at a free end portion of the supporting member, and mounted on the original cover between the supporting member and the original cover; and a resilient means rotationally urging the original cover in an opening direction, and urging said lifting member in a direction overlapping with the supporting member, between the mounting member and the supporting member.

* * * * *